(12) United States Patent
Ikushima

(10) Patent No.: US 11,958,072 B2
(45) Date of Patent: Apr. 16, 2024

(54) LIQUID MATERIAL APPLICATION METHOD AND DEVICE FOR IMPLEMENTING SAID METHOD

(71) Applicant: MUSASHI ENGINEERING, INC., Mitaka (JP)

(72) Inventor: Kazumasa Ikushima, Mitaka (JP)

(73) Assignee: MUSASHI ENGINEERING, INC., Mitaka (JP)

(*) Notice: Subject to any disclaimer, the term of this patent is extended or adjusted under 35 U.S.C. 154(b) by 404 days.

(21) Appl. No.: 16/615,658

(22) PCT Filed: May 28, 2018

(86) PCT No.: PCT/JP2018/020263
§ 371 (c)(1),
(2) Date: Nov. 21, 2019

(87) PCT Pub. No.: WO2018/221432
PCT Pub. Date: Dec. 6, 2018

(65) Prior Publication Data
US 2020/0179974 A1     Jun. 11, 2020

(30) Foreign Application Priority Data
May 31, 2017 (JP) .................................. 2017-107664

(51) Int. Cl.
*B05C 5/02* (2006.01)
*B05D 1/26* (2006.01)
(Continued)

(52) U.S. Cl.
CPC .............. *B05C 5/0212* (2013.01); *B05D 1/26* (2013.01); *B05D 5/06* (2013.01); *G02F 1/133512* (2013.01)

(58) Field of Classification Search
CPC . B05C 5/0225; B05C 5/0275; B05C 11/1034; B05D 1/26; B05D 5/06
See application file for complete search history.

(56) References Cited

U.S. PATENT DOCUMENTS 6,547,616 B1 *   4/2003   Furukawa ......... G02F 1/133512
                                              445/24
2007/0145164 A1   6/2007   Ahmadi et al.
(Continued)

FOREIGN PATENT DOCUMENTS

JP   2007-167844 A   7/2007
JP   2009-106934 A   5/2009
(Continued)

OTHER PUBLICATIONS

International Search Report dated Jul. 10, 2018, issued in counterpart application No. PCT/JP2018/020263. (2 pages).
(Continued)

*Primary Examiner* — Nathan H Empie
(74) *Attorney, Agent, or Firm* — WHDA, LLP

(57) ABSTRACT

A discharge device includes a nozzle (50) having a plurality of discharge ports, a liquid chamber (26) communicating with the plurality of discharge ports via a plurality of discharge flow paths, and a plunger rod (18) that reciprocates in the liquid chamber and is narrower than the liquid chamber. The plurality of discharge ports (62) is arranged un a straight nozzle arrangement line, and arranged with such a distance therebetween that globs of a liquid material having landed on an application target join together to form an application line. A plurality of liquid globs having been discharged from the plurality of discharge ports (62) have no contact with each other before landing on the application target, and letting the globs of the liquid material having landed join together on the application target.

21 Claims, 8 Drawing Sheets

(51) Int. Cl.
   *B05D 5/06*   (2006.01)
   *G02F 1/1335*   (2006.01)

(56) References Cited

U.S. PATENT DOCUMENTS

| | | | |
|---|---|---|---|
| 2009/0107398 | A1 | 4/2009 | Hassler, Jr. et al. |
| 2014/0346253 | A1 | 11/2014 | Ikushima |
| 2015/0138485 | A1 | 5/2015 | Masuda |
| 2016/0136661 | A1* | 5/2016 | Hong ............... B05C 5/0225 239/1 |
| 2017/0066005 | A1 | 3/2017 | Ikushima |

FOREIGN PATENT DOCUMENTS

| | | | |
|---|---|---|---|
| JP | 2015-135384 | A | 7/2015 |
| JP | 2015-158525 | A | 9/2015 |
| JP | 2016-027352 | A | 2/2016 |
| KR | 101100549 | B1 | 12/2011 |
| KR | 101301107 | B1 | 8/2013 |
| TW | I565528 | B | 1/2017 |
| WO | 2008108097 | A1 | 9/2008 |
| WO | 2015/137271 | A1 | 9/2015 |
| WO | WO-2015137271 | A1 * | 9/2015 ........... B05C 5/0212 |

OTHER PUBLICATIONS

International Preliminary Report on Patentability (Forms PCT/IPEA/409) of International Application No. PCT/JP2018/020263 dated May 28, 2018. (5 pages).
Office Action dated Dec. 3, 2021, issued in counterpart TW Application No. 107118515, with Search report and English translation of Search Report. (8 pages).
Office Action dated Mar. 15, 2022, issued in counterpart to JP application No. 2019-522206. With English Translation. (15 pages).
Office Action dated Jun. 23, 2022, issued in counterpart KR Application No. 10-2019-7029725, with English Translation. (13 pages).
Office Action dated Dec. 12, 2022, issued in counterpart EP application No. 16 809 651.5. (4 pages).

* cited by examiner

[Fig.1]
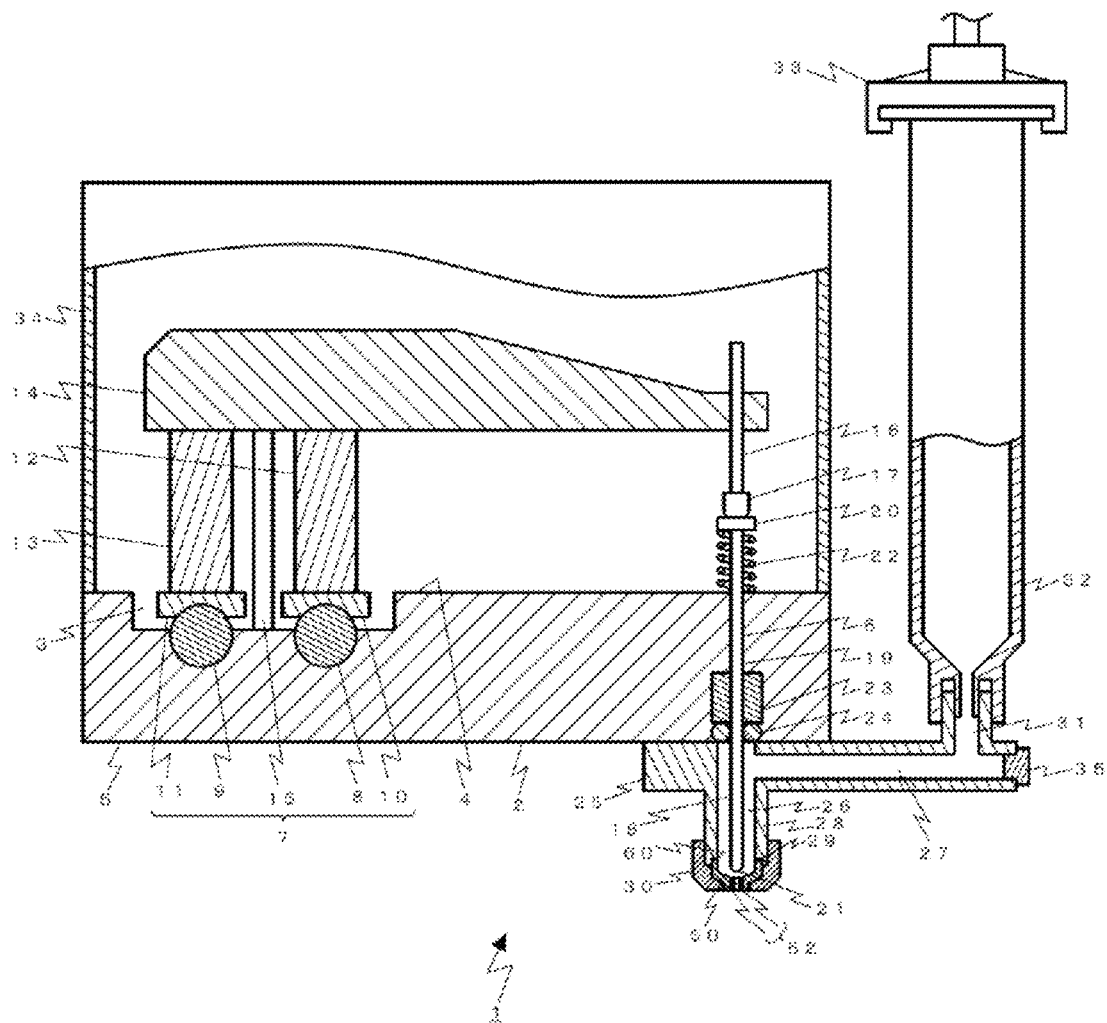

[Fig.2]
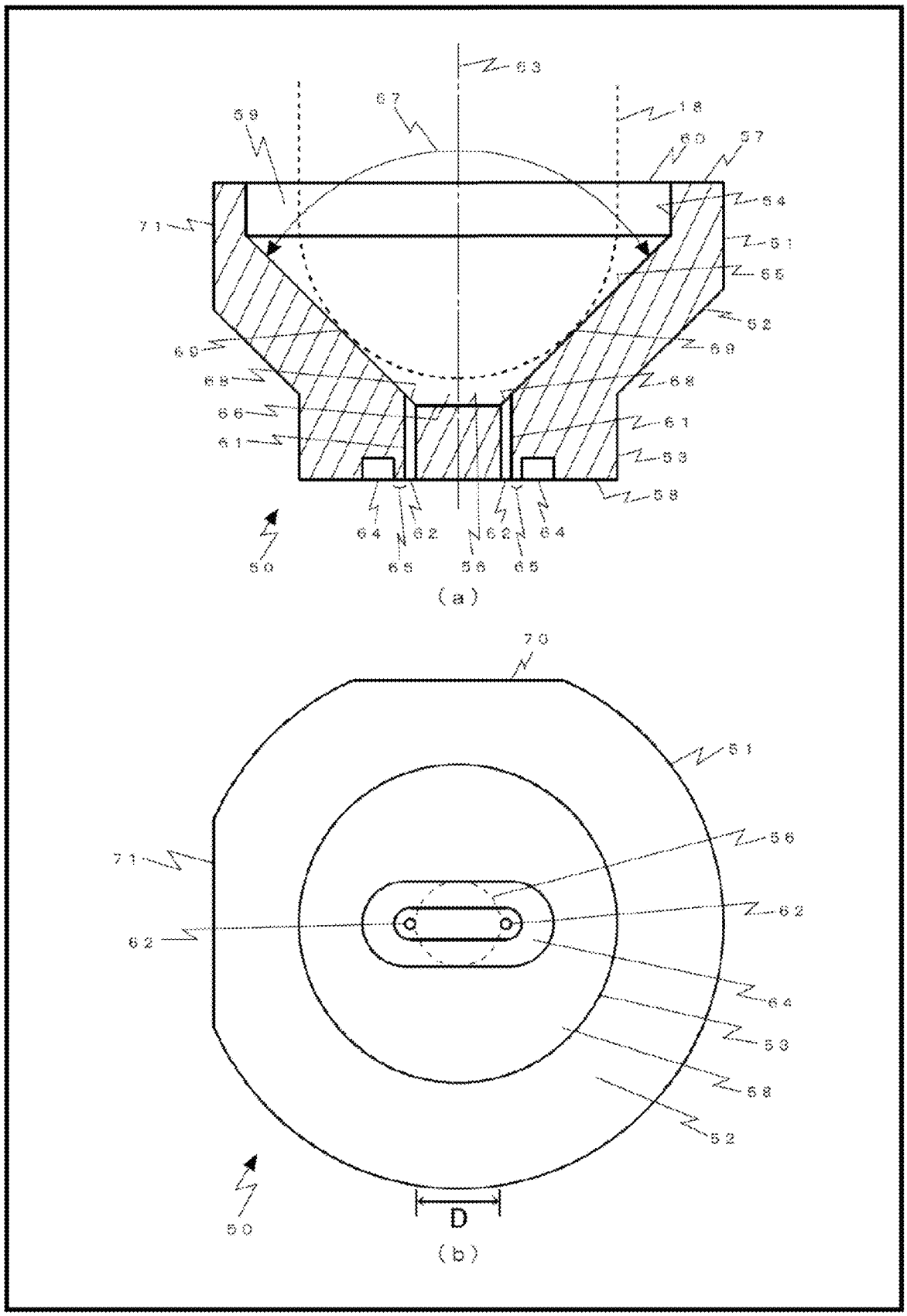

[Fig.3]
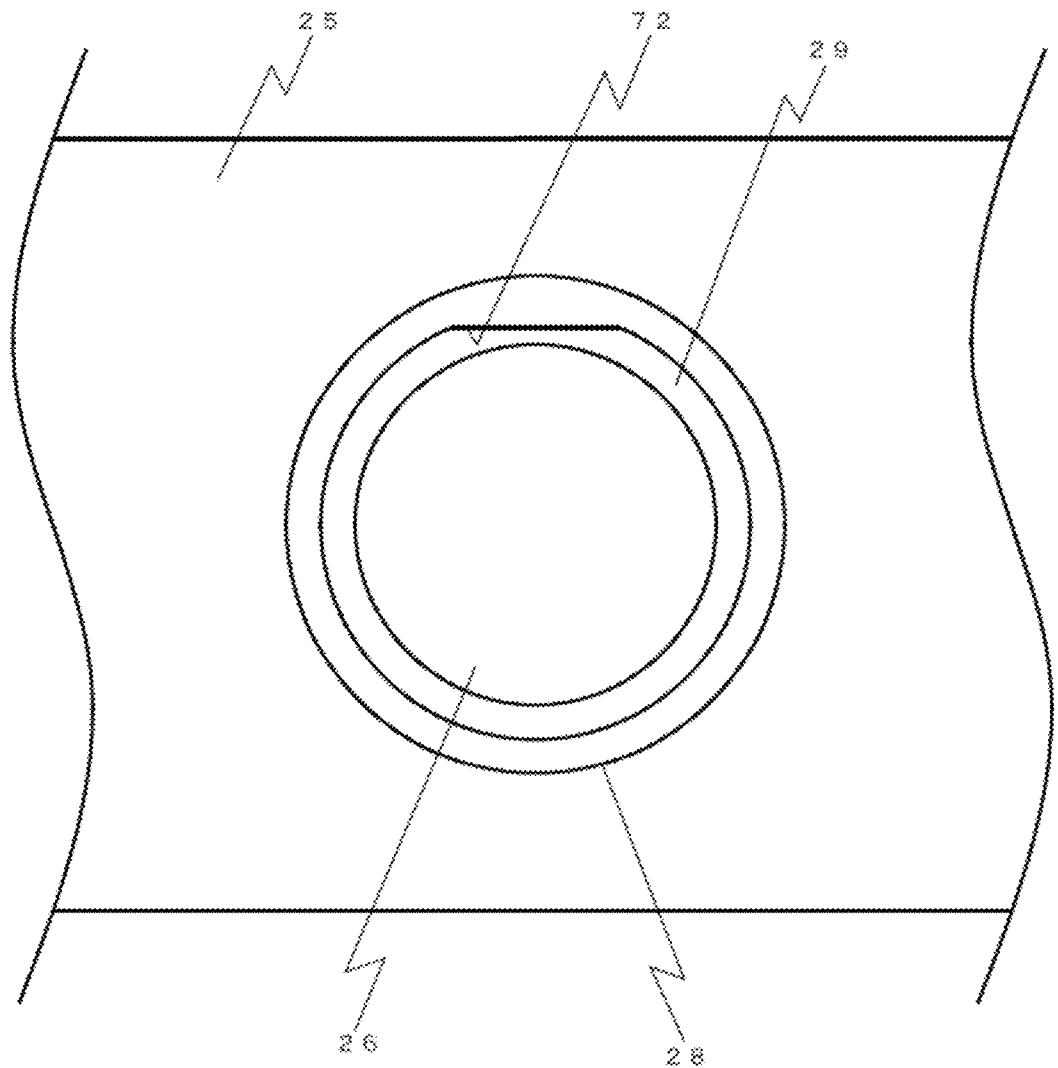

[Fig.4]
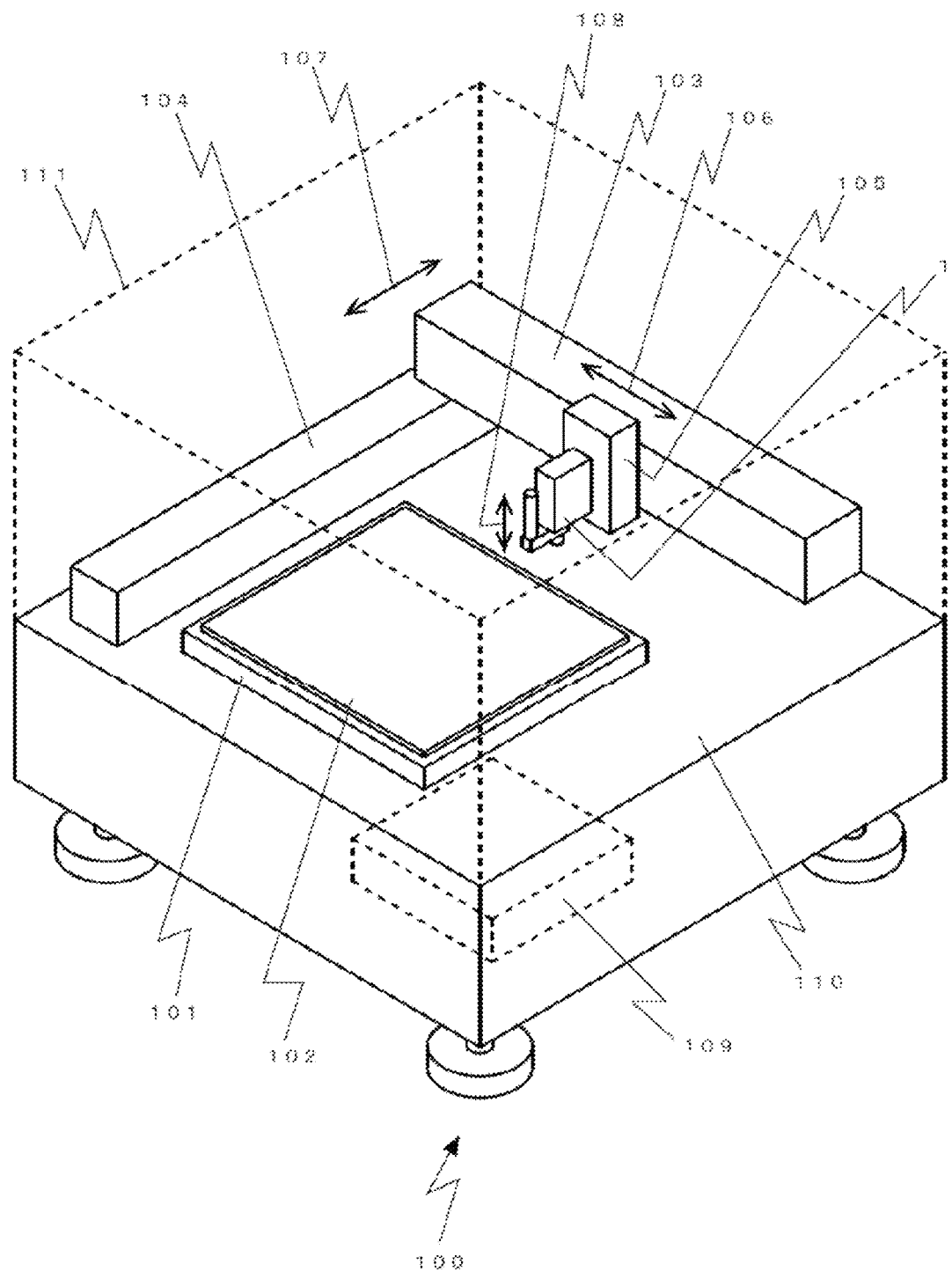

[Fig.5]
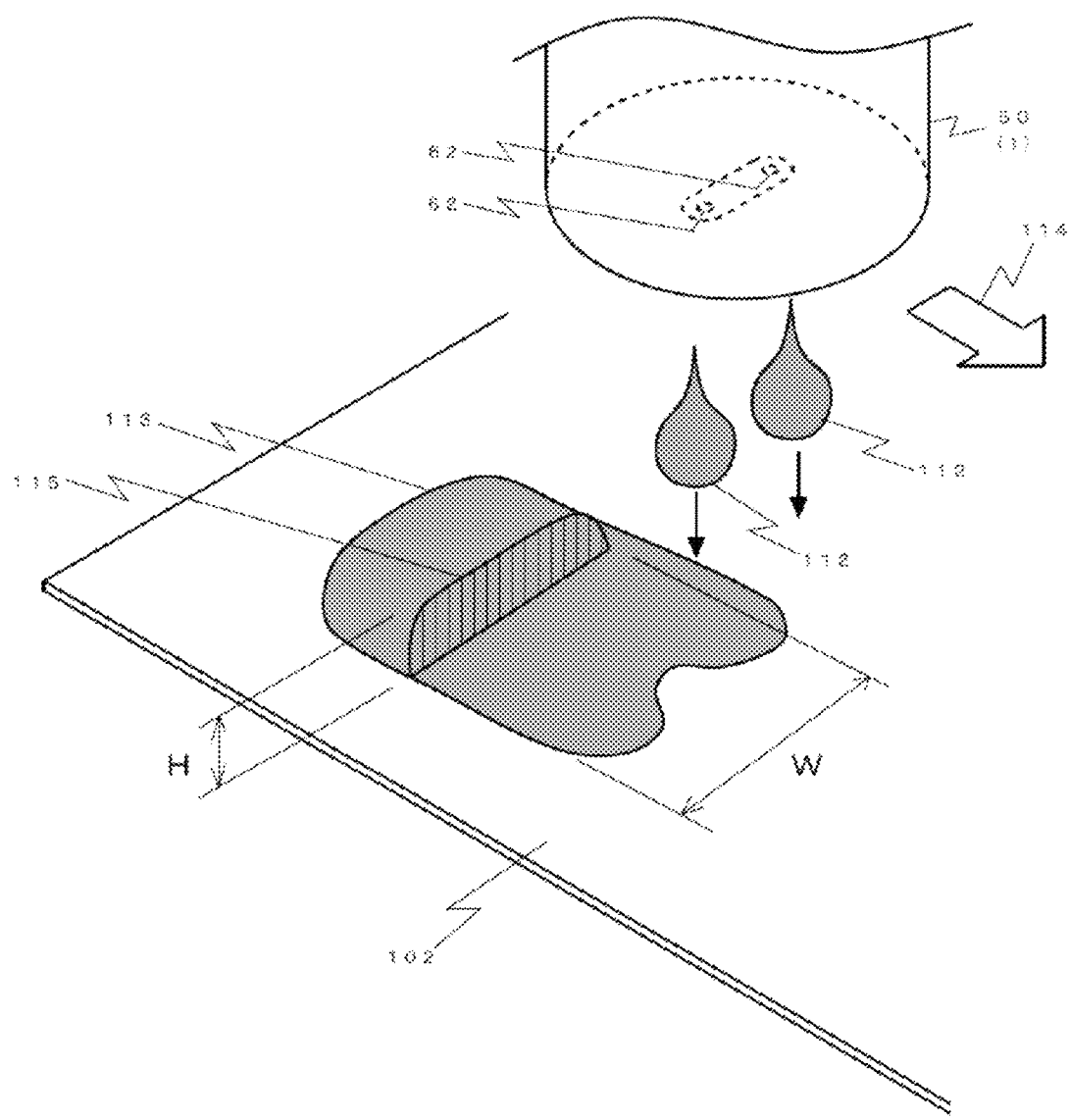

[Fig.6]
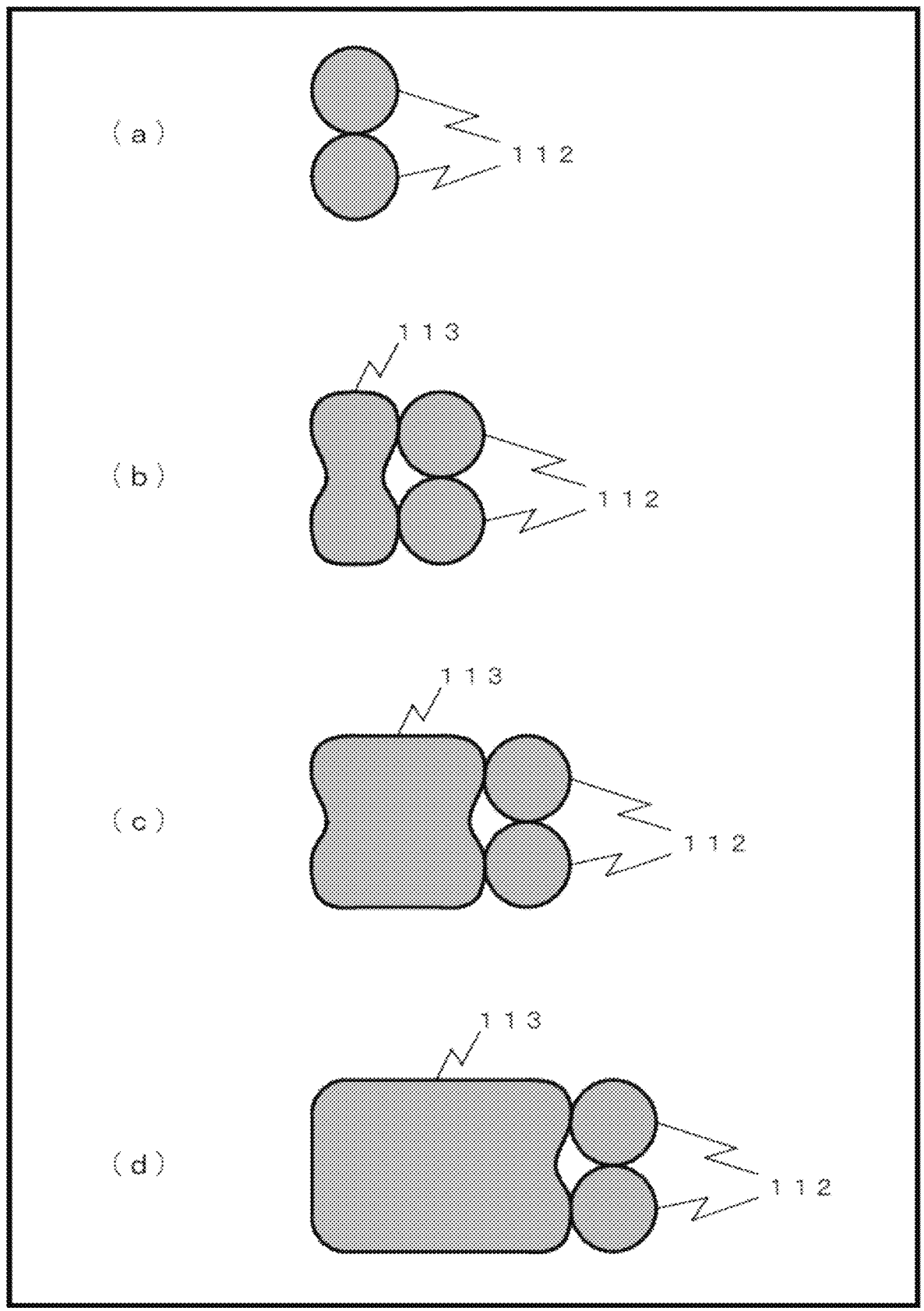

[Fig.7]
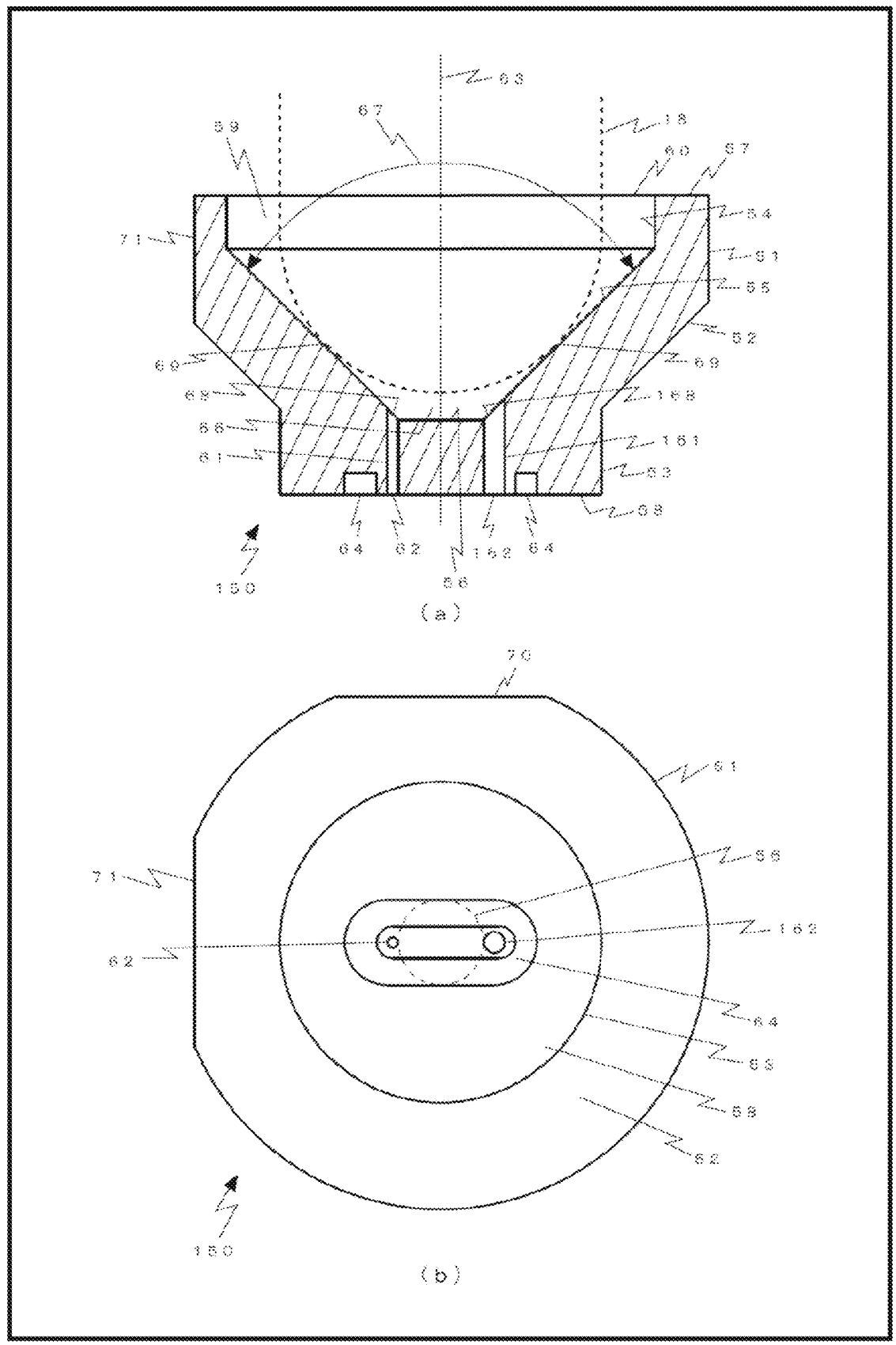

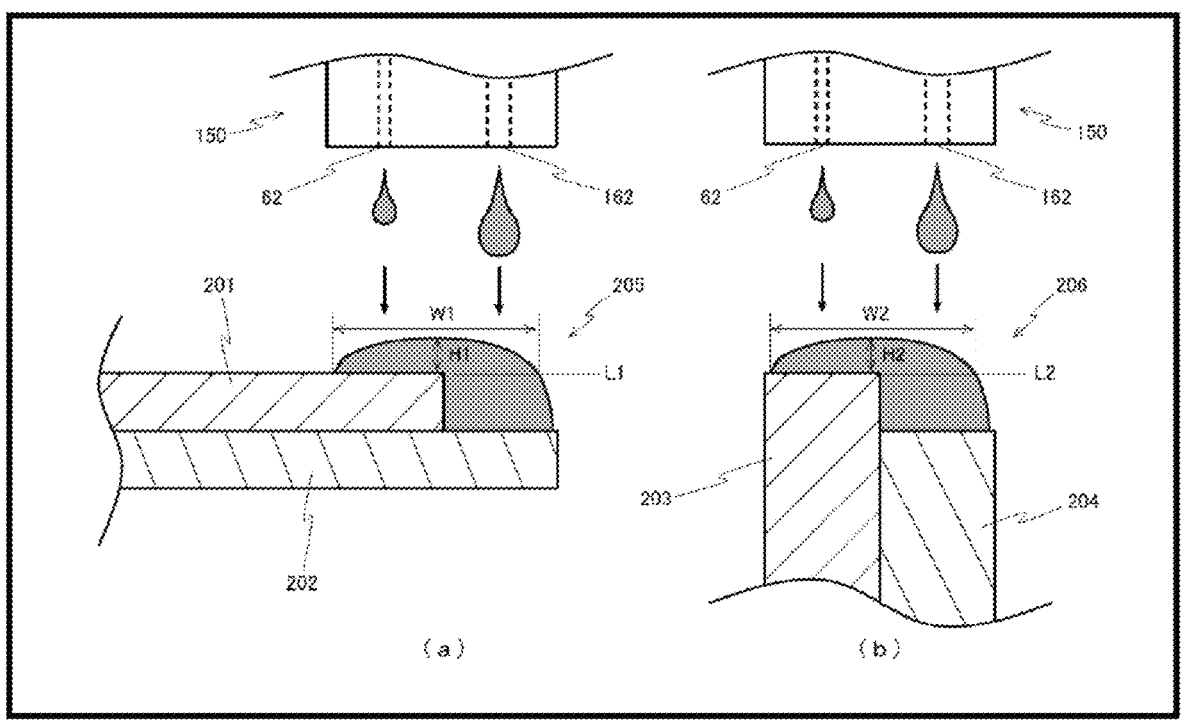
[Fig.8]

LIQUID MATERIAL APPLICATION METHOD AND DEVICE FOR IMPLEMENTING SAID METHOD

TECHNICAL FIELD

The present invention relates to a liquid material application method for performing line-drawing application and a device for implementing the method.

BACKGROUND ART

A so-called jet type discharge device discharges a liquid material in the form of a droplet from a discharge port by a forward moving process of a plunger rod disposed in a liquid chamber communicating with a nozzle having the discharge port. Such a discharge device is used to successively discharge liquid droplets and form an application line (Patent Document 1). A cross-section of a droplet of the liquid material adhered to an application target or a line resulting from continuous droplets is semicircular or semi-elliptical, and has a relatively large height compared to a width thereof. In other words, the present situation is that only application lines of which height-to-width ratio of the cross-section is about one can be formed (hereinafter, the height divided by the width of an application line's cross-section is sometimes referred to as "aspect ratio").

Meanwhile, a liquid crystal display device is constituted mainly by a liquid crystal panel including two glass substrates keeping liquid crystal therebetween and the like, and a backlight including a light source and the like. In a liquid crystal display device, light from the backlight sometimes passes around the peripheries of the glass substrates and leaks out, which disturbs light that has penetrated the liquid crystal panel. To prevent this, a light-blocking member is arranged at the periphery of the liquid crystal panel. As the light-blocking member, a molding, a tape, or the like is often used (Patent Documents 2, 3), however, it has become increasing that a light-blocking liquid material is applied (Patent Document 4).

PRIOR ART LIST

Patent Document

Patent Document 1: International Publication No. 2015/137271
Patent Document 2: Japanese Patent Laid-Open Publication No. 2015-158525
Patent Document 3: Japanese Patent Laid-Open Publication No. 2015-135384
Patent Document 4: Japanese Patent Laid-Open Publication No. 2016-27352

SUMMARY OF THE INVENTION

Problems to be Solved by the Invention

For use in realizing a desired application pattern by linear application of a liquid material, a cross-sectional shape with a small height-to-width ratio of an application line is sometimes required (for example, in recent liquid crystal display devices, forming a low-height light-blocking portion is required at the need for reduction in thickness).

Jet type discharge devices excel in that an application line can be formed rapidly. However, the jet type discharge devices have a problem that it is difficult for an application line to have a cross-sectional shape with a smaller height-to-width ratio.

Thus, an object of the present invention is to provide a technology that enables line-drawing application such that a cross-sectional shape has a small height-to-width ratio using a jet type discharge device.

Further, performing linear application of a liquid material onto a step portion is sometimes needed. Another object of the present invention is to provide a technology that enables linear application onto a step portion by one-time sweeping.

Means for Solving the Problems

An application method of the present invention is a method of performing linear application onto an application target using an application device, the application device including a discharge device that is of jet type, and a relative driving device configured to move the discharge device and the application target relative to each other, the discharge device including a nozzle having a plurality of discharge ports, a liquid chamber communicating with the plurality of discharge ports via a plurality of discharge flow paths, and a plunger rod that reciprocates in the liquid chamber and is narrower than the liquid chamber, wherein the plurality of discharge ports is arranged on a straight nozzle arrangement line, and arranged with such a distance therebetween that globs of a liquid material having landed on the application target join together to form an application line, and the method includes forming an application line perpendicular to the nozzle arrangement line by, while moving the discharge device and the application target relative to each other in a direction perpendicular to the nozzle arrangement line, successively discharging the liquid material such that a plurality of liquid globs having been discharged from the plurality of discharge ports have no contact with each other before landing on the application target, and letting, the globs of the liquid material having landed join together on the application target.

In the application method, the plurality of discharge ports may be constituted by a plurality of discharge ports having a uniform shape.

In the application method, the plurality of discharge ports may include a discharge port having a first opening area and a discharge port having a second opening area larger than the first opening area.

In the application method, the second opening area may be 1.4 to 16 times as large as the first opening area.

In the application method, the application target may have a step portion, and the method may include facing a discharge port having the first opening area toward an upper step of the step portion and a discharge port having the second opening area toward a lower step of the step portion to form the application line.

In the application method, the liquid material may be a light-blocking liquid material and form the application line on a periphery of a liquid crystal panel.

In the application method, a value obtained by dividing a height of the application line by a width of the application line may be smaller than 0.8.

In the application method, a value obtained by dividing a height of the application line by a width of the application line may be smaller than 0.6.

In the application method, the nozzle may be one of nozzles including a first nozzle to be detachably attached to the discharge device and a second nozzle to be detachably attached to the discharge device, the second nozzle being different from the first nozzle in distance between the plurality of discharge ports, and the method may include attaching the one nozzle selected depending on a width of an application line to be formed to the discharge device for forming the application line.

A discharge device of the present invention is a discharge device that is of jet type for implementing the application method, including a nozzle having a plurality of discharge ports, a liquid chamber communicating with the plurality of discharge ports via a plurality of discharge flow paths, and a plunger rod that reciprocates in the liquid chamber and is narrower than the liquid chamber.

In the discharge device, the nozzle may communicate with the liquid chamber and have a truncated-cone-shaped inner space into which the plunger rod proceeds, and a width of the plunger rod may be larger than a furthest distance between outer peripheries of the plurality of discharge ports.

In the discharge device, the plunger rod may be configured to be seated on a tapered surface of the truncated-cone-shaped inner space of the nozzle.

In the discharge device, each of the plurality of discharge flow paths may have an elliptical inflow port continuous with an inner wall of the nozzle.

In the discharge device, the nozzle may have a lower end surface having the plurality of discharge ports, and an annular groove may be formed around the plurality of discharge ports on the lower end surface.

In the discharge device, the discharge device may include a liquid contact member including a cylinder portion in which the liquid chamber is formed, and the nozzle may be detachably attached to a lower end of the cylinder portion.

In the discharge device, the discharge device may include a positioning mechanism allowing for positioning the nozzle arrangement line with respect to the cylinder portion.

In the discharge device, the positioning mechanism may be able to realize the positioning at a first position where the nozzle arrangement line has a first angle with respect to a line perpendicular to the plunger rod, and at a second position where the nozzle arrangement line is set at 90 degrees with respect to the first angle.

An application device of the present invention is an application device for implementing the application method, including a discharge device that is of jet type, and a relative driving device configured to move the discharge device and the application target relative to each other, the discharge device including a nozzle having a plurality of discharge ports, a liquid chamber communicating with the plurality of discharge ports via a plurality of discharge flow paths, and a plunger rod that reciprocates in the liquid chamber and is narrower than the liquid chamber.

An application device of another aspect of the present invention, includes a discharge device that is of jet type, and a relative driving device configured to move the discharge device and an application target relative to each other, the discharge device including a nozzle having a plurality of discharge ports, a liquid chamber communicating with the plurality of discharge ports via a plurality of discharge flow paths, a plunger rod that reciprocates in the liquid chamber and is narrower than the liquid chamber, and a liquid contact member including a cylinder portion in which the liquid chamber is formed, wherein the plurality of discharge ports is arranged on a straight nozzle arrangement line, and arranged with such a distance therebetween that globs of a liquid material having landed on the application target join together to form an application line, the nozzle is detachably attached to a lower end of the cylinder portion to be positioned at a first position where the nozzle arrangement line has a first angle with respect to a line perpendicular to the plunger rod, or at a second position where the nozzle arrangement line is set at 90 degrees with respect to the first angle, and the application device is capable of executing first application, in a state where the nozzle is attached at the first position, to form an application line perpendicular to the nozzle arrangement line by, while moving the discharge device and the application target relative to each other in a direction perpendicular to the nozzle arrangement line, successively discharging the liquid material such that a plurality of liquid globs having been discharged from the plurality of discharge ports have no contact with each other before landing on the application target, and letting the globs of the liquid material having landed join together on the application target, and second application, in a state where the nozzle is attached at the second position, to form an application line in a same direction as the nozzle arrangement line by, while moving the discharge device and the application target relative to each other in the same direction as the nozzle arrangement line, successively discharging the liquid material such that a plurality of liquid globs having been discharged from the plurality of discharge ports have no contact with each other before landing on the application target, and letting the globs of the liquid material having landed join together on the application target.

Advantageous Effect of the Invention

According to the present invention, it becomes possible to perform line-drawing application such that a cross-sectional shape has a small height-to-width ratio using a jet type discharge device.

BRIEF DESCRIPTION OF THE DRAWINGS

FIG. 1 is a partial sectional view of a discharge device according first embodiment.

FIG. 2 shows (a) a sectional view and (b) a bottom view of a nozzle included in the discharge device according to the first embodiment.

FIG. 3 is an enlarged bottom view of a nozzle attachment portion of a liquid contact member included in the discharge device according to the first embodiment.

FIG. 4 is a schematic perspective view of an application device according to the first embodiment.

FIG. 5 is an explanatory view explaining an operation of the application device according to the first embodiment.

FIG. 6 shows images as viewed from above illustrating how a plurality of liquid droplets having been discharged join together in the first embodiment. (a) shows the image immediately after two liquid droplets have landed, (b) shows the image immediately after four liquid droplets have landed, (c) shows the image immediately after six liquid droplets have landed, and (d) shows the image immediately after eight liquid droplets have landed.

FIG. 7 shows (a) a sectional view and (b) a bottom view of a nozzle included in a discharge device according to a second embodiment.

FIG. 8 shows views explaining application to a workpiece having a step. (a) shows application to a step portion constituted by two plates arranged in a stack and (b) shows application to a step portion constituted by two plates erected vertically side by side.

MODE FOR PERFORMING THE INVENTION

Example modes for performing the present invention will be described below. A jet type discharge device described in the Specification refers to a discharge device (dispenser) that causes a fore end of a plunger rod (valve element), which is disposed in a liquid chamber communicating with a nozzle and is narrower than the liquid chamber, to move forward and then stop suddenly for applying inertial force to a liquid material to discharge the liquid material. Jet type discharge devices include a valve element seating style jet type (e.g., a jet type that causes a valve element to collide against a valve seat to discharge a liquid material) and a valve element non-seating style jet type (e.g., a jet type that causes a valve element to move forward and then stop suddenly for applying inertial force to a liquid material to discharge the liquid material). The present invention is applicable to any one of the jet types.

First Embodiment (1) Discharge Device

As shown in FIG. 1, a discharge device 1 of a first embodiment mainly includes a base member 2, actuators (12, 13), an arm 14, a plunger rod 18, a liquid contact member 25, and a nozzle 50. The discharge device 1 relates to the valve element seating style jet type discharge device that discharges and flies a liquid material 113 in the form of a liquid droplet 112.

Hereinafter, for convenience of explanation, a nozzle 50 side, an arm 14 side, a plunger-rod 18 side, and an actuator (12,13) side are in some cases referred to as "lower", "upper", "front", and "rear", respectively.

The base member 2 is a block-like member. In the rear, an upper surface 4 has a recessed portion 3 for arranging an rocking mechanism 7 therein, and in the front, a plunger rod insertion hole 6 is formed to extend through the base member 2 from the upper surface 4 to a lower surface 5.

The rocking mechanism 7 includes supporting members (8, 9) of which columnar members are fixedly fitted into grooves arranged at a bottom surface of the recessed portion 3 of the base member 2, the actuators (12, 13) arranged on the supporting members (8, 9), connecting members (10, 11) coupled to the lower ends of the actuators (12, 13), and a rod-shaped fitting tool 15.

The upper surface of the supporting member (8, 9) is formed of a smooth convex curve. The lower surface of the connecting member (10, 11) facing this curve has a depression formed of a smooth concave curve that fits the shape of the upper surface of the supporting member (8, 9). The depression has a curvature equal to or smaller than (in other words, a curvature radius larger than) the upper surface of the supporting member (8, 9).

The actuators (12, 13) are coupled to the connecting members (10, 11) at the lower ends and are coupled to the arm 14 at the upper ends. The actuators (12, 13) of the present embodiment are pole-shaped multi-layered piezoelectric elements constituted by laminating a piezoelectric ceramic material with a high distortion rate, an internal electrode, an external electrode, and an insulator, for example. The actuators (12, 13) elongate and contract in a laminating direction (the vertical direction in the present embodiment) by applying a voltage. The actuators (12, 13) used in the present embodiment have a thickness of 5 to 100 mm and a deformation range in the laminating direction of 5 to 100 µm, for example. The present embodiment employs a mode where two actuators (12, 13) are aligned in the front-rear direction.

The arm 14 coupled to the upper ends of the actuators (12, 13) is a long member extending in the front-rear direction substantially parallel to the upper surface 4 of the base member 2 and is directly or indirectly fixed to the base member 2 with the fixing tool 15. The arm 14 is made of hard material such as a metal with small distortion and directly transmits driving force of the actuators (12, 13) via an arm rod 16 to the plunger rod 18. The arm 14 has a length larger than at least elongation of the actuators (12, 13) and functions as a displacement enlarging mechanism that enlarges a displacement amount by the actuators (12, 13). In the present embodiment, the displacement by the actuators (12, 13) is elongated 3 to 100 times (preferably 5 to 50 times) by the arm 14 and is transmitted to the plunger rod 18, for example. A stroke can also be adjusted dynamically by adjusting a displacement amount by the actuators (12, 13) such that the arm 14 has a desired inclination angle with respect to the base member 2.

The arm rod 16 having a pressing portion 17 is detachably fixed to the front of the arm 14. The convex pressing portion 17 is arranged at the lower end of the arm rod 16. The pressing portion 17 separate from an upper end 20 of the plunger rod moves down to hit the upper end 20, which causes the plunger rod 18 to proceed rapidly. Since the arm 14 moves along a circular-arch-shaped track centering around the actuators (12, 13), a contact position and a contact angle between the pressing portion 17 and the upper end 20 of the plunger rod change depending on the vertical position of the pressing portion 17. Thus, the surface of the pressing portion 17 facing the upper end 20 of the plunger rod is preferably formed into a shape having a curve, and in the present embodiment, a hemisphere or semi-ellipsoid, for example.

The plunger rod 18 includes a rod portion 19 constituted by a pole-like member extending straight in the vertical direction, a hemispherical lower end 21, and the upper end 20 constituted by a plate-like member having a diameter larger than that of the rod portion 19. The plunger rod 18 can be made of metallic material, ceramic material, or resin material, for example. The plunger rod 18 has such a length that the upper end 20 and an upper-end side portion of the rod portion 19 project above the upper surface 4 of the base member 2. Additionally, the plunger rod 18 is inserted through the plunger rod insertion hole 6 of the base member 2 and an elastic body 22 such that the lower end 21 and a lower-end side portion of the rod portion 19 project below the lower surface 5 of the base member 2. In other words, the plunger rod 18 is longer than the vertical thickness of the base member 2, is inserted through the plunger rod insertion hole 6, and sticks the upper-end 20 side and the lower-end 21 side out from the base member 2. Though the lower end 21 of the plunger rod 18 is formed to be hemispherical in the present embodiment, it may be formed into any shape such as a plane, a shape having a projection at the fore end, or a semi-ellipsoid, for example.

A guide 23 and a seal member 24 are arranged at the lower side of the plunger rod insertion hole 6. As mentioned above, the arm 14 moves along the circular-arch-shaped track centering around the actuators (12, 13). However, by arranging the guide 23 and the seal member 24, the movement direction of the plunger rod 18 is regulated to be straight in the vertical direction.

Between the upper end 20 of the plunger rod and the upper surface 4 of the base member, the elastic body 22 in a shape that surrounds the rod portion 19 is arranged. Though the elastic body 22 is constituted by a compression coil spring in the present embodiment, it may be configured by a flat spring, an air spring, or the like. The upper end 20 of the plunger rod has a diameter larger than those of the rod portion 19 and the elastic body 22, and upward force from the elastic body 22 always exerts to the upper end 20 of the plunger rod. The upper end 20 of the plunger rod stops at a position in contact with the pressing portion 17 of the arm rod. Since the upper end 20 of the plunger rod is not coupled to the pressing portion 17 of the arm rod, the plunger rod 18 is easily detached.

The liquid contact member 25 in which a liquid chamber 26 and a supply flow path 27 are formed is detachably attached to the front of the lower surface 5 of the base member 2. The liquid chamber 26 is a space formed in a circular-cylinder-shaped cylinder portion 28 extending downward from the lower end of the plunger rod insertion hole 6. The liquid chamber 26 is formed to surround the lower end 21 of the plunger rod 18 and the lower-end side of the rod portion 19 projecting from the lower surface 5 of the base member. Since the liquid chamber 26 has a diameter larger than that of the rod portion 19, the lower end 21 of the plunger rod 18 and the rod portion 19 can reciprocate without contact with the inner periphery surface of the liquid chamber 26, and can thus move rapidly. The inner-periphery side of the lower end of the cylinder portion 28 has a nozzle attachment portion constituted by a stepped portion 29 having an expanded diameter compared to the liquid chamber 26. The nozzle attachment portion has a shape fitting the outer shape of the upper end of the nozzle 50, and thus the nozzle 50 fits into the nozzle attachment portion (details will be described later). A nozzle fixing tool 30 to fix the nozzle 50 to the liquid contact member 25 is detachably attached to the outer-periphery side of the lower end of the liquid chamber 26. Between the upper end of the liquid chamber 26 and the lower surface 5 of the base member, the seal member 24 is arranged, which prevents the liquid material from intruding into the guide 23.

The nozzle 50 has two discharge ports (62, 62) at the lower end for permitting the liquid chamber 26 to communicate with the outside, and has an upper end opening 60 continuous with the liquid chamber 26 at the upper end. The upper end opening 60 has a diameter equal to the inner diameter of the liquid chamber 26, which makes the liquid material 113 flow easily. Details will be described later.

The supply flow path 27 is a flow path extending forward from the liquid chamber 26. The supply flow path 27 communicates with the liquid chamber 26 at one side end and communicates with a supply port 31 at the upper end at the side opposite to the liquid chamber 26. The side end of the supply flow path 27 at the side opposite to the liquid chamber 26 is closed by a closing plug 35 that is detachably attached. The supply port 31 connects to a reservoir 32. The liquid material 113 in the reservoir 32 is pressurized by compressed gas supplied via an adapter tube 33, and passes through the supply flow path 27 to be supplied to the liquid chamber 26. The present embodiment employs a mode where the supply port 31 directly connects to the reservoir 32, but the supply port 31 may connect to a stationary container having a comparatively large capacity (several liters to several ten liters, for example) via a liquid delivery tube therebetween. Note that when the liquid material 113 has a high fluidity, pressure may not be applied to the reservoir 32.

A cover 34 that covers the actuators (12, 13), the arm 14, and the like is arranged over the upper surface 4 of the base member 2. This prevents dust, the liquid material 113, and the like from adhering to the movable parts such as the actuators (12, 13) and the arm 14, otherwise the adherence may cause a trouble. Further, this prevents an operator from carelessly touching the movable parts such as the actuators (12, 13) and the arm 14.

In the present embodiment, the displacement enlarging mechanism with the piezoelectric elements and the arm 14 is used as the driving device for operating the plunger rod 18. However, another type of driving device (actuator) may be used, which includes, for example: one that operates the plunger rod 18 with a piston, which is arranged at a driving-chamber side of the plunger rod 18 to divide a driving chamber into two, by utilizing force of compressed gas or a spring (i.e., like a driving device of Patent Document 1); one that operates the plunger rod 18 with a combination of an electric motor and a ball screw; one that operates the plunger rod 18 by utilizing an electromagnet; and the like.

As shown in FIG. 2, the nozzle 50 of the present embodiment includes a circular-cylinder-shaped trunk portion 51, an inclination portion 52 narrowing downward from the trunk portion 51, and a fore end 53 extending downward from the inclination portion 52. The inside of the part from the trunk portion 51 to the inclination portion 52 has an upper inside surface 54 parallel to an extending direction of the trunk portion 51 (a direction along a central axis line 63), a tapered surface 55 that narrows downward from the upper inside surface 54, and an inner bottom surface 56 located at the lower end of the tapered surface 55. As shown in FIG. 2(a), each of the inner bottom surface 56, an upper end surface 57, and a lower end surface 58 is constituted by a plane parallel to a plane perpendicular to the central axis line 63.

An inner space 59 of the nozzle 50 (i.e., a space surrounded by the upper inside surface 54, the tapered surface 55, and the inner bottom surface 56) has a truncated cone shape and always communicates with the liquid chamber 26. The upper inside surface 54 preferably has an inner diameter equal to the inner diameter of the liquid chamber 26. Two discharge flow paths (61, 61) extending along the central axis line 63 are arranged within the fore end 53. The upper ends of the discharge flow paths (61, 61) constitute inflow ports (68, 68) communicating with the inner space 59. The lower ends of the discharge flow paths (61, 61) constitute discharge ports 62 communicating with the outside. In the present embodiment, lower portions of the discharge flow paths (61, 61) below the inflow ports (68, 68) are columnar flow paths having a uniform diameter. The diameter of the discharge flow path 61 is set to fall within a range of 0.03 to 0.3 mm, for example. Alternatively, the inflow ports (68, 68) may have a diameter larger than that of the discharge ports (62, 62). The discharge flow paths (61, 61) may be formed into a polygonal column or an elliptical column. The angle (reference symbol 67) of the tapered surface 55 is set to fall within a range of 75 to 150 degrees. As described later, by arranging an inner wall constituted by the tapered surface 55, accelerating effect on the liquid material pressed by the lower end 21 of the plunger rod 18 is enhanced. However, any of the settings is not limited to the above-mentioned range and will be changed appropriately depending on the nature of a liquid material to be used or a desired line shape (i.e., a width and a height).

The two discharge ports (62, 62) are formed at symmetrical positions across the central axis 63 and are formed on lines extending parallel to the central axis line 63 downward from points of intersection between the tapered surface 55 and the inner bottom surface 56. In other words, the two discharge ports (62, 62) are formed to align on one straight line intersecting the central axis 63 therebetween (hereinafter, the line connecting the centers of the two discharge ports (62, 62) may be referred to as "nozzle arrangement line") at such positions that the discharge ports (62, 62) touch the periphery of the inner bottom surface 56 (see the dotted line in FIG. 2(b)). When forming an application line by an application method of the present invention, the nozzle 50 is arranged such that the nozzle arrangement line is perpendicular to an application direction for performing application. As shown in FIG. 6, the two liquid droplets (112, 112) having landed on a workpiece 102 as an application target join together on the workpiece 102 to form one straight application line. Therefore, the discharge ports (62, 62) need to be aligned on one straight line perpendicular to the application line. Herein, if a distance D between the discharge ports (62, 62) (a distance between the rightmost point of the left discharge port 62 and the leftmost point of the right discharge port 62, which may be referred to as closest distance, hereinafter) is equal to or smaller than a certain length, liquid droplets having been discharged from the discharge ports (62, 62) would join together in the air to form one droplet, which thus requires careful attention. The reason is that when the liquid droplets having been discharged from the discharge ports (62, 62) join together in the air to become one liquid droplet and then land on the workpiece, the above-mentioned aspect ratio is quite likely to become large as in the case where a droplet is discharged from one discharge port. The diameters of the two discharge ports (62, 62) are the same and the distance D as the closest distance between the discharge ports (62, 62) is two to twelve times as large as the diameter of the discharge port 62, for example.

In an application operation, discharge is performed while moving in the direction perpendicular to the alignment direction of the two discharge flow paths (61, 61) (the nozzle arrangement line) for line-drawing application. A nozzle 50 of which distance D between the two discharge flow paths (61, 61) is suitable for realizing a desired application line width is selected. That is, it is preferable to prepare multiple nozzles for realizing desired application line widths and select a nozzle 50 having a corresponding distance D depending on a desired application line width for each work to perform application. The diameter of the two discharge ports (62, 62) suitable for forming a desired application line width is small compared to the case where the same application line width is formed with one discharge port. In this manner, since the liquid material is discharged into two droplets, instead of discharging as one liquid droplet conventionally, an amount of the liquid material per droplet become small while achieving the line width substantially equal to the desired line width in the embodiment. Therefore, wide-line-drawing application can be performed while suppressing the height.

Since each of the upper end of the discharge flow paths (61, 61) is arranged in such a way as to cross the tapered surface 55, the inflow ports (68, 68) are inclined. Thus, the inflow ports (68, 68) are elliptical and have an area larger than that of the cross-section perpendicular to the axis line (i.e., a circle). Additionally, each of the inflow ports (68, 68) is inclined toward the center side of the nozzle 50. That is, the each of the inflow ports (68, 68) has a large area and is oriented toward the center side of the nozzle 50 (the side of the lower end 21 of the plunger rod), which yields an effect that the liquid material 113 easily flows into the discharge flow paths (61, 61).

An annular groove portion 64 with a constant width is arranged around the discharge ports 62 of the lower end surface 58. In the present embodiment, the width of the groove portion 64 is nearly equal to the distance D between the two discharge flow paths (61, 61), and the depth of the groove portion 64 is nearly half of the distance D between the two discharge flow paths (61, 61), for example. The distance from the discharge flow path 61 to the groove portion 64 (in terms of a tube, corresponding to the thickness of the tube; reference symbol 65) is 0.5 to 1 time as large as the diameter of the discharge flow path 61. For example, the shape of the groove portion 64 is, as viewed from the bottom surface, an oval that surrounds the two discharge ports (62, 62). This causes the two discharge ports (62, 62) to protrude from the environs and have a periphery. Therefore, it is possible to prevent extra liquid material from adhering to the lower end surface 58 around the discharge ports 62 and to perform stable discharge with few variabilities. When a discharge amount is small, it is particularly effective. Since the nozzle 50 of the present embodiment is used for linedrawing application, it is unnecessary to arrange the groove portion 64 between the two discharge ports (62, 62) as exemplified. Alternatively, a groove portion may be arranged between the two discharge ports (62, 62).

In a discharge operation, in the discharge device 1 of the present embodiment, the lower end portion 21 of the plunger rod 18 is seated on the tapered surface 55 of the nozzle 50 to cause the plunger rod 18 to stop moving down (see the dotted-line of FIG. 2(a)). In this way, the liquid material in a pressurizing space 66, which is formed of the lower surface of the lower end 21 of the plunger rod 18, the inner bottom surface 56, and a portion of the tapered surface 55, is pressurized by the lower end 21 of the plunger rod 18 and is discharged and flied from the discharge ports (62, 62). In the present embodiment, by arranging the inner bottom surface 56 parallel to the plane perpendicular to the central axis line, and forming the pressurizing space 66 into a truncated cone to make the volume small, the pressure in the pressurizing space 66 is easily raised. Furthermore, by making the diameter of the plunger rod 18 larger than the furthest distance between outer peripheries of the two discharge ports (62, 62) (=the above-mentioned distance D+the diameter of the discharge flow path×2), and forming the tapered surface 55 in the shape narrowing downward, the proceeding movement of the plunger rod 18 can cause sufficient pressure to make the liquid material 113 flow into the two discharge flow paths (61, 61) at the same time. Thus, even when the discharge ports (62, 62) are configured to be smaller than a single discharge port of the conventional discharge device, the two liquid droplets (112, 112) can be discharged and flied. From another point of view, the lower end 21 of the plunger rod 18 making contact with the tapered surface 55 at a position (reference symbol 69) above the inner bottom surface 56 also generates pressure to make the liquid material 113 smoothly flow into the two discharge flow paths (61, 61).

Though the numbers of the discharge ports 62 and the discharge flow paths 61 are two in the present embodiment, they may be three or more.

In the present embodiment, two flat portions (70, 71) that function as a positioning mechanism are arranged at the trunk portion 51 of the nozzle 50. The flat portions (70, 71) are two surfaces (70, 71) including the surface 70 parallel to the alignment direction of the two discharge ports (62, 62), and the surface 71 perpendicular to the surface 70. Meanwhile, as shown in FIG. 3, one flat portion 72 that functions as the positioning mechanism is also arranged at the nozzle attachment portion (the stepped portion 29) arranged at the lower end of the cylinder portion 28 of the liquid contact member 25. In the present embodiment, the orientation of the flat portion 72 of the nozzle attachment portion is parallel to the extending direction of the supply flow path 27. When attaching the nozzle 50, one of the two flat portions (70, 71)

of the nozzle 50 is fit to the flat portion 72 of the nozzle attachment portion for attachment. Since the flat portions (70, 71) of the nozzle 50 have fixed orientations with respect to the two discharge ports (62, 62), the flat portion 72 of the nozzle attachment portion have a fixed orientation with respect to the supply flow path 27 and thus to the body of the discharge device 1, just fitting the flat portions to each other allows for easily setting the alignment direction of the two discharge ports (62, 62) with respect to the body of the discharge device 1.

Since the nozzle 50 has flat portions of which orientations are different (perpendicular in the present embodiment, thus the orientations are 90 degrees different), by attaching the nozzle 50 in a different way to fit the differently oriented flat portion to the flat portion 72 of the nozzle attachment portion, the alignment direction of the two discharge ports (62, 62) can be easily changed. In this way, configuring the nozzle 50 and the nozzle attachment portion with the respective flat portions (70, 71, 72) can realize easy setting of the alignment direction of the two discharge ports (62, 62) with respect to the body of the discharge device 1. Further, arranging two flat portions (70, 71) at the nozzle 50 side and arranging one flat portion (72) at the nozzle-attachment-portion side can realize easy change of the alignment direction of the two discharge ports (62, 62). That is, with just turning the nozzle 50 by 90 degrees to switch the attachment way of the nozzle 50, line-drawing application along two different directions can be realized (in other words, the application method of the present invention and the application method according to Patent Document 1 can be realized). Instead of switching the attachment way of the nozzle 50 in one discharge device 1 appropriately, two discharge devices 1 to which respective nozzles 50 are attached in different orientations may be prepared. Further, only one flat portion may be formed at the nozzle 50 to achieve constant positioning for realizing the application method of the present invention by aligning the orientation of the flat portion of the nozzle 50 with the orientation of the flat portion 72 of the nozzle attachment portion.

(2) Discharge Operation

The discharge device 1 of the present embodiment constituted as above operates as follows.

(2-1) Neutral Position.

A state where the first and second actuators (12, 13) are not energized and non-operating, and where the arm 14 is roughly parallel to the upper surface of the base member 2 is called neutral position (see FIG. 1). At this time, the lower end 21 of the plunger rod 18 has no contact with the tapered surface 55 of the nozzle 50, and the discharge ports (62, 62) are open. Further, the upper end 20 of the plunger rod 18 has contact with the pressing portion 17 of the arm rod 16 due to the biasing effect of the elastic body 22. Alternatively, a state where the lower end 21 of the plunger rod 18 has contact with the tapered surface 55 may be defined as neutral position by adjusting the vertical positions of the pressing portion 17 of the arm rod 16 and the plunger rod 18, the biasing force of the elastic body 22, and the like. The contact state can prevent the liquid material 113 from leaking out of the discharge ports (62, 62).

(2-2) Upward Movement

When the forward first actuator 12 is energized and elongated, and the rearward second actuator 13 is kept in a non-energized and non-elongating/non-contracting state, the connecting members (10, 11) respectively coupled to the lower ends of the first and second actuators (12, 13) move on the respective supporting members (8, 9), causing the first and second actuators (12, 13) to incline rearward. The arm 14 coupled to the upper ends of the first and second actuators (12, 13) correspondingly rotates counterclockwise centering around the fixing tool 15 and moves the arm rod 16 upward. When the arm rod 16 moves up, the plunger rod 18 also moves up due to the biasing effect of the elastic body 22. When moving up, the pressing portion 17 of the arm rod 16 and the upper end 20 of the plunger rod 18 may hold the contact state, or may be temporarily in a non-contact state and later in a contact state. The pressing portion 17 of the arm rod 16 moves up with tracing a circular-arch-shaped track due to the rotation of the arm 14. Meanwhile, the plunger rod 18 moves up linearly due to the function of the guide 23. Thus, the pressing portion 17 of the arm rod 16 and the upper end 20 of the plunger rod 18 move with positional deviation in the front-rear direction. However, as described above, since the lower surface of the pressing portion 17 is formed of a curve, and the upper end 20 of the plunger rod 18 has such a size that the positional deviation can be tolerated, the appropriate contact state can be maintained. This constitution of the pressing portion 17 and the upper end 20 also yields a similar effect in a downward movement that will be described below. Herein, a voltage may be applied not only to the first actuator 12 but also to the rearward second actuator 13 for contraction to cause larger displacement in the pressing portion and the plunger rod 18.

(2-3) Downward Movement

When the forward first actuator 12 is in a non-elongating/non-contracting state without the energization thereto, and the rearward second actuator 13 is energized and elongated, the connecting members (10, 11) respectively coupled to the lower ends of the first and second actuators (12, 13) move on the respective supporting members (8, 9), causing the first and second actuators (12, 13) to incline forward. The arm 14 coupled to the upper ends of the first and second actuators (12, 13) correspondingly rotates clockwise centering around the fixing tool 15 and moves the arm rod 16 downward. When the arm rod 16 moves down, the pressing portion 17 of the arm rod 16 presses the upper end 20 of the plunger rod 18 and the plunger rod 18 moves down against the biasing force of the elastic body 22. When the plunger rod 18 moves down, the lower end 21 of the plunger rod 18 is seated on the tapered surface 55 of the nozzle 50 and the liquid material 113 is discharged from the discharge ports (62, 62) in the form of a liquid droplet 112. As in the case of the upward movement, when moving down, the pressing portion 17 of the arm rod 16 and the upper end 20 of the plunger rod 18 may hold the contact state, or may be temporarily in a non-contact state and later in a contact state. Herein, a voltage may be applied not only to the second actuator 13 but also to the forward first actuator 12 for contraction to cause larger displacement in the pressing portion 17 and the plunger rod 18.

Note that, though the lower end 21 of the plunger rod 18 is seated on the tapered surface 55 of the nozzle 50 to cause the plunger rod 18 to stop moving in the present embodiment, a non-seating mode is also encompassed by the technical idea of the present invention.

(2-4) Discharge Operation

The above-mentioned movements (2-2), (2-3) constitute one basic cycle of the discharge operation. By repeating this operation, successive discharge and thus line-drawing application can be performed. In the present embodiment, it is possible to reciprocate the plunger rod 18 at a frequency of 100 to 500 cycles per second or higher, for example.

According to the discharge device described above, the liquid material, which would have been discharged as one liquid droplet, is divided into two droplets to reduce an amount per droplet and is discharged with a certain width. Therefore, wide-line-drawing application can be performed while suppressing the height.

(3) Application Device

As shown in FIG. 4, an application device 100 according to the first embodiment mainly includes the discharge device 1 for discharging the liquid material 113, a stage 101 having an upper surface on which the application target 102 is placed, a relative driving device (103, 104, 105) that moves the discharge device 1 and the stage 101 relative to each other, and a control device 109 that controls an operation of the relative driving device.

The stage 101 is a flat-plate-like member having the flat upper surface on which the application target 102 is placed. To fix the application target 102 to the stage 101, following mechanisms can be used, for example: a mechanism that sucks and fixes the application target 102 by sucking the air through a plurality of holes leading from the inside of the stage 101 to the upper surface; and a mechanism that fixes the application target 102 by holding the application target 102 between fixing members which are fixed to the stage 101 by fixing means such as screw(s).

The relative driving device is constituted by an X-direction driving device 103, a Y-direction driving device 104, and a Z-direction driving device 105. In this embodiment, the relative driving device is configured to move the discharge device 1 relative to the stage 101 in the X-direction (reference symbol 106), the Y-direction (reference symbol 107), and the Z-direction (reference symbol 108). However, the relative driving device (103, 104, 105) is not limited to the above configuration and may take any mode that allows the discharge device 1 and the stage 101 to move relative to one another. For example, the discharge device 1 may move in the X-direction (reference symbol 106) and the Z-direction (reference symbol 108), and the stage 101 may move in the Y-direction (reference symbol 107), respectively. Alternatively, the discharge device 1 installed on an inverted U-shaped (also referred to as portal) frame straddling the stage 101 may move in the Z-direction (reference symbol 108), and the stage 101 may move in the X-direction (reference symbol 106) and the Y-direction (reference symbol 107). For the relative driving device (103, 104, 105), a combination of an electric motor (a servomotor, a stepping motor, or the like) and a ball screw, a linear motor, or the like may be used.

The control device 109 includes a processing device, a storage device, an input device, and an output device, each not shown, connects to the discharge device 1 and the relative driving device (103, 104, 105) described above, and controls operations of the respective devices. As the processing device and the storage device, for example, a personal computer (PC), a programmable logic controller (PLC), or the like may be used. As the input device and the output device, a keyboard, a mouse, and a display as well as a touch panel combining input and output may be used. The control device 109 includes an application program for selectively realizing the application method where the nozzle arrangement line is perpendicular to the direction of the application line (the application method of the present invention), and the application method where the nozzle arrangement line is coincident with the direction of the application line (the application method according to Patent Document 1).

The above-described respective devices are disposed on top of and inside a base 110. The top of the base 110 provided with the discharge device 1, the stage 101, and the relative driving device (103, 104, 105) described above is preferably covered with a cover 111 shown by the dotted line. This can prevent dust, which would cause a device malfunction or a product defect, from entering the inside of the application device 100, and prevent careless contact between an operator and a movable portion such as the relative driving device (103, 104, 105). For convenience in work, an openable door may be arranged at the side surface of the cover 111.

(4) Application Operation

The application device 100 according to the present embodiment can apply the liquid material 113 linearly with a desired cross-sectional shape (width W, height H) to the application target 102 by a combination of the operation of the discharge device 1 and the operation of the relative driving device (103, 104, 105).

As shown in FIG. 5, an example will be described where the discharge device 1 installed on the relative driving device, not shown (only the nozzle 50 is shown), is moved relative to the application target 102 in a direction shown by the reference symbol 114 for performing line-drawing application. The liquid material having been discharged from the discharge ports (62, 62) may separate from the discharge ports (62, 62) and then form as many droplets as the discharge ports before landing on the application target 102 as shown in FIG. 5, or may separate from the discharge ports (62, 62) after having contact with the workpiece 102 and then form as many droplets as the discharge ports on the application target 102. In the Specification, the liquid material, having boon discharged from the discharge port, before separating from the discharge port, and the liquid droplet, having been discharged and then separated from the discharge port, before landing on the application target may be called "liquid glob" collectively.

The nozzle 50 is attached to the discharge device 1 such that the two discharge ports (62, 62) of the nozzle 50 are aligned in a direction perpendicular to an extending direction of an application line, that is a movement direction (reference symbol 114). By performing the successive discharge operation while moving the discharge device 1, to which the nozzle 50 is attached as described above, in the direction shown by the references symbol 114, the liquid droplets (112, 112) having been discharged from the discharge ports (62, 62) adhere onto the application target 102 successively and join together to form an application line. For convenience of explanation, a cross-section 115 at an arbitrary position of the application line formed by liquid droplets joined together is shown with hatched lines.

In the present embodiment, the two discharge ports (62, 62) are arranged with a distance therebetween corresponding to a desired line width W, so that the line width W of the application line formed on the application target 102 will be the desired line width W as it is. Further, since the liquid material, which would have been discharged as one liquid droplet, is divided into two droplets, an amount per droplet is reduced while forming the desired line width W. Therefore, the height H can be suppressed. According to the application device 100 of the present embodiment, it is possible to form an application line having an aspect ratio (the height H divided by the width W) of less than 0.8 (preferably less than 0.6, more preferably less than 0.5), for example. When a liquid material with a viscosity of about 4000 [mPa·s] was used to form an application line, it was confirmed that the width was 0.5 [μm] or less and the height was 0.2 [μm] or less (i.e., the aspect ratio was 0.4). An application line having such an aspect ratio is suitable for forming a light-blocking portion arranged at or in the vicinity of an outer periphery of a liquid crystal panel, for example.

The width and the height of a formed application line can be measured by a known measuring method (e.g., a laser displacement meter, image processing using a captured image, or measurement with a dial gauge).

Second Embodiment

A second embodiment relates to a discharge device including a nozzle 150 having two discharge ports (62, 162) of which opening areas are different. The discharge device of the second embodiment is similar to the discharge device 1 of the first embodiment except for the nozzle 150. Thus, the same components as those of the first embodiment are denoted by the same reference symbols and the explanations thereof may be omitted below.

In a liquid crystal panel of which two glass substrates (plate-like bodies) affix to each other, a step may be formed at the periphery of the affixing substrates. In some cases, a step portion that is arranged based on a design may require linear application thereto. It has turned out that, when trying to perform the linear application onto such a step portion, the nozzle 50 of the first embodiment sometimes fails to form a clear application line straddling the step. In more detail, a liquid droplet having been applied to the upper step and a liquid droplet having been applied to the lower step do not sometimes join together. Such a problem can be resolved by performing the linear application multiple times in an overlapping manner. However, there is a problem that the overlapping application requires additional time and decreases productivity. There is another problem that the overlapping application makes it difficult to realize the wide and low application shape.

In the present embodiment, a discharge port 62 having a first opening area and a discharge port 162 having a second opening area larger than the first opening area are arranged to allow for realizing wide and low shaped linear application straddling a step portion (205, 206) by one-time sweeping. In detail, by making the diameter of the discharge port 162 facing the lower-step side substrate (202, 204) larger than the diameter of the discharge port 62 facing the upper-step side substrate (201, 203), the discharge amount to the lower-step side substrate (202, 204) is relatively increased. This causes a liquid droplet having been applied onto the lower-step side substrate (202, 204) and a liquid droplet having been applied onto the upper-step side substrate (201, 203) to join together. In this manner, without performing the overlapping application multiple times on the same line, the linear application straddling the step portion (205, 206) can be performed by one-time sweeping. Additionally, the wide and low application shape with respect to the periphery can be realized.

The nozzle 150 of the present embodiment is shown in FIG. 7. The nozzle 150 differs from the nozzle 50 of the first embodiment in that one discharge flow path 161 out of two discharge flow paths (61, 161) extending along the central axis line 63 within the fore end has an inner diameter larger than the inner diameter of the other discharge flow path 61. Each of the two discharge flow paths (61, 161) has a cylindrical shape with a uniform diameter, however; this shape is not a limitation as in the first embodiment. The ratio of the opening areas of the discharge port 62 and the discharge port 162 is not limited, however, it is disclosed that the opening area of the discharge port 162 is 1.4 to 16 times as large as the opening area of the discharge port 62, for example.

When application is performed using the nozzle 150 of FIG. 7, a liquid material can be applied in a shape straddling the step portion (205, 206) as shown in FIG. 8. In FIG. 8, the nozzle 150 discharges the liquid material while moving along the direction perpendicular to the figure for performing linear application. As shown in FIG. 8, in the nozzle 150 of the present embodiment, the discharge port 162 facing the lower-step side substrate has a diameter larger than the diameter of the discharge port 62 facing the upper-step side substrate and the discharge amount to the lower-step side substrate (202, 204) is relatively increased. Therefore, the liquid material having been applied to the lower-step side substrate (201, 203) and the liquid material having been applied to the upper-step side substrate (202, 204) can join together straddling the step by one-time sweeping. Additionally, the application line formed by joining together has a wide and low application shape with respect to the periphery. Specifically, it is possible to form an application line such that the height (H1, H2) of a liquid droplet is low compared to the width (W1, W2) thereof on the line (L1, L2) extending along horizontal direction from the top surface of the upper step in the parallel direction.

Application using the nozzle 150 of the present embodiment described above can realize the same application shape even on a step portion as the application to a portion without step. Also in the present embodiment, it is possible to form an application line having an aspect ratio (the height H1 divided by the width W1 or the height H2 divided by the width W2) of less than 0.8 (preferably less than 0.6, more preferably less than 0.5), for example.

The preferred embodiment examples of the present invention have been described above. However, the technical scope of the present invention is not limited to the description of the above-mentioned embodiments. Various alterations and modifications can be applied to the above embodiment examples, and such altered or modified modes also fall within the technical scope of the present invention. For example, a discharge port for application to a lower step of a step portion may be arranged at a lower position than a discharge port for application to an upper step of the step portion.

LIST OF REFERENCE SYMBOLS 1 discharge device/2 base member/3 recessed portion/4 upper surface/5 lower surface/6 plunger rod insertion hole/7 rocking mechanism/8 first supporting member/9 second supporting member/10 first connecting member/11 second connecting member/12 first actuator/13 second actuator/14 arm/15 fixing tool/16 arm rod/17 pressing portion/18 plunger rod/19 rod portion/20 upper end/21 lower end/22 elastic body/23 guide/24 seal member/25 liquid contact member/26 liquid chamber/27 supply flow path/28 cylinder portion/29 stepped portion/30 nozzle fixing tool/31 supply port/32 reservoir/33 adapter tube/34 cover/50 nozzle/51 trunk portion/52 inclination portion/53 fore end/54 upper inside surface/55 tapered surface/56 inner bottom surface/57 upper end surface/58 lower end surface/59 inner space/60 upper end opening (of nozzle)/61 discharge flow path/62 discharge port/63 central axis line/64 groove portion/65 thickness of discharge flow path/66 pressurizing space/67 angle of tapered surface/68 inflow port/69 contact point between plunger rod and tapered surface/70 nozzle flat portion (parallel)/71 nozzle flat portion (perpendicular)/72 flat portion (of nozzle attachment portion)/100 application device/101 stage/102 application target (workpiece)/103 X-direction driving device/104 Y-direction driving device/105 Z-direction driving device/106 X-direction of movement/107 Y-direction of movement/108 Z-direction of movement/109 control device/110 base/111 cover/112 liquid droplet/113 liquid material/114 movement direction of discharge device/115 cross-section of application line/150 nozzle/161 discharge flow path/162 discharge port/168 inflow port/201 substrate constituting upper step/202 substrate constituting lower step/203 substrate constituting upper step/204 substrate constituting lower step/205 step portion (when arranged in a lamination)/206 step portion (when erected vertically side by side)/H, H1, H2 application line height/W, W1, W2 application line width

The invention claimed is:

1. An application method of performing linear application onto an application target using an application device, the application device comprising:
 a discharge device that is of jet type; and
 a relative driving device configured to move the discharge device and the application target relative to each other, the discharge device comprising:
 a nozzle having a plurality of discharge ports;
 a liquid chamber communicating with the plurality of discharge ports via a plurality of discharge flow paths; and
 a plunger rod that reciprocates in the liquid chamber and is narrower than the liquid chamber,
 wherein the nozzle communicates with the liquid chamber and has a truncated-cone-shaped inner space into which the plunger rod proceeds, the truncated-cone-shaped inner space being surrounded and defined by an upper inside surface of a side wall of the nozzle, a tapered surface of the nozzle that narrows downward from the upper inside surface, and an inner bottom surface located at a lower end of the tapered surface,
 wherein the inner bottom surface is constituted by a plane perpendicular to an axis of the plunger,
 wherein the plurality of discharge flow paths comprises respective inclined inflow ports continuous with the tapered surface of the nozzle and each of the inflow ports is inclined downward toward the center of the nozzle,
 wherein the plurality of discharge ports is arranged on a straight nozzle arrangement line, and arranged with such a distance therebetween that globs of a liquid material having landed on the application target join together to form an application line, and
 the method includes forming an application line perpendicular to the nozzle arrangement line by, while moving the discharge device and the application target relative to each other in a direction perpendicular to the nozzle arrangement line, successively discharging the liquid material such that a plurality of liquid globs having been discharged from the plurality of discharge ports have no contact with each other before landing on the application target, and letting the globs of the liquid material having landed join together on the application target.

2. The application method according to claim 1, wherein the plurality of discharge ports is constituted by two discharge ports having a uniform shape, and
 the application line perpendicular to the nozzle arrangement line is formed by successively discharging the liquid material such that two liquid globs having been discharged from the two discharge ports have no contact with each other before landing on the application target, and letting the globs of the liquid material having landed join together on the application target.

3. The application method according to claim 1, wherein the plurality of discharge ports includes a discharge port having a first opening area and a discharge port having a second opening area larger than the first opening area.

4. The application method according to claim 3, wherein the second opening area is 1.4 to 16 times as large as the first opening area.

5. The application method according to claim 1, wherein
 the plunger rod is configured to be seated on the tapered surface of the truncated-cone-shaped inner space of the nozzle, and
 lower portions of the discharge flow paths below the inflow ports are columnar flow paths extending vertically and having a uniform diameter.

6. The application method according to claim 1, wherein a value obtained by dividing a height of the application line by a width of the application line is smaller than 0.8.

7. The application method according to claim 1, wherein a value obtained by dividing a height of the application line by a width of the application line is smaller than 0.6.

8. The application method according to claim 1, wherein the nozzle includes a first nozzle to be detachably attached to the discharge device and a second nozzle to be detachably attached to the discharge device, the second nozzle being different from the first nozzle in distance between the plurality of discharge ports, and the method includes attaching the one nozzle selected depending on a width of an application line to be formed to the discharge device for forming the application line.

9. An application method of performing linear application onto an application target using an application device, the application device comprising:
 a discharge device that is of j et type; and
 a relative driving device configured to move the discharge device and the application target relative to each other, the discharge device comprising:
 a nozzle having a plurality of discharge ports;
 a liquid chamber communicating with the plurality of discharge ports via a plurality of discharge flow paths; and
 a plunger rod that reciprocates in the liquid chamber and is narrower than the liquid chamber,
 wherein the nozzle communicates with the liquid chamber and has a truncated-cone-shaped inner space into which the plunger rod proceeds, the truncated-cone-shaped inner space being surrounded and defined by an upper inside surface of a side wall of the nozzle, a tapered surface of the nozzle that narrows downward from the upper inside surface, and an inner bottom surface located at a lower end of the tapered surface,
 wherein the inner bottom surface is constituted by a plane perpendicular to an axis of the plunger,
 wherein the plurality of discharge flow paths comprises respective inclined inflow ports continuous with the tapered surface of the nozzle and each of the inflow ports is inclined downward toward the center of the nozzle,
 wherein the plurality of discharge ports is arranged on a straight nozzle arrangement line, and arranged with such a distance therebetween that globs of a liquid material having landed on the application target join together to form an application line,
 the method includes forming an application line perpendicular to the nozzle arrangement line by, while moving the discharge device and the application target relative to each other in a direction perpendicular to the nozzle arrangement line, successively discharging the liquid material such that a plurality of liquid globs having been discharged from the plurality of discharge ports have no contact with each other before landing on the application target, and letting the globs of the liquid material having landed join together on the application target, the application target has a step portion, and the method includes facing a discharge port having a first opening area toward an upper step of the step portion and a discharge port having a second opening area toward a lower step of the step portion to form the application line.

10. The application method according to claim 9, wherein the liquid material is a light-blocking liquid material, and the application line is formed on a periphery of a liquid crystal panel.

11. A discharge device that is of jet type for implementing the application method according to claim 1, comprising:
a nozzle having a plurality of discharge ports;
a liquid chamber communicating with the plurality of discharge ports via a plurality of discharge flow paths; and
a plunger rod that reciprocates in the liquid chamber and is narrower than the liquid chamber,
wherein the nozzle communicates with the liquid chamber and has a truncated-cone-shaped inner space into which the plunger rod proceeds, the truncated-cone-shaped inner space being surrounded and defined by an upper inside surface of a side wall of the nozzle, a tapered surface of the nozzle that narrows downward from the upper inside surface, and an inner bottom surface located at a lower end of the tapered surface,
wherein the inner bottom surface is constituted by a plane perpendicular to an axis of the plunger,
wherein the plurality of discharge flow paths comprises respective inclined inflow ports continuous with the tapered surface of the nozzle and each of the inflow ports is inclined downward toward the center of the nozzle,
wherein the plurality of discharge ports is arranged on a straight nozzle arrangement line, and arranged with such a distance therebetween that globs of a liquid material having landed on the application target join together to form an application line.

12. The discharge device according to claim 11, wherein a width of the plunger rod is larger than a furthest distance between outer peripheries of the plurality of discharge ports, and the plunger rod is configured to be seated on a tapered surface of the truncated-cone-shaped inner space of the nozzle.

13. The discharge device according to claim 12, wherein the inflow ports of the plurality of discharge flow paths are arranged at points where the tapered surface intersects with the inner bottom surface.

14. The discharge device according to claim 13, wherein the inflow ports of the plurality of discharge flow paths are elliptical inflow ports continuous with the tapered surface and lower portions of the discharge flow paths below the inflow ports are columnar flow paths having a uniform diameter.

15. The discharge device according to claim 11, wherein the nozzle has a lower end surface having the plurality of discharge ports, and an annular groove is formed around the plurality of discharge ports on the lower end surface.

16. The discharge device according to claim 11, comprising
a liquid contact member comprising a cylinder portion in which the liquid chamber is formed,
wherein the nozzle is detachably attached to a lower end of the cylinder portion.

17. The discharge device according to claim 16, comprising a positioning mechanism allowing for positioning the nozzle arrangement line with respect to the cylinder portion.

18. The discharge device according to claim 17, wherein the positioning mechanism is able to realize the positioning at a first position where the nozzle arrangement line has a first angle with respect to a line perpendicular to the plunger rod, and at a second position where the nozzle arrangement line is set at 90 degrees with respect to the first angle.

19. An application device for implementing the application method according to claim 1, comprising:
a discharge device that is of jet type; and
a relative driving device configured to move the discharge device and the application target relative to each other,
the discharge device comprising:
a nozzle having a plurality of discharge ports;
a liquid chamber communicating with the plurality of discharge ports via a plurality of discharge flow paths; and
a plunger rod that reciprocates in the liquid chamber and is narrower than the liquid chamber,
wherein the nozzle communicates with the liquid chamber and has a truncated-cone-shaped inner space into which the plunger rod proceeds, the truncated-cone-shaped inner space being surrounded and defined by an upper inside surface of a side wall of the nozzle, a tapered surface of the nozzle that narrows downward from the upper inside surface, and an inner bottom surface located at a lower end of the tapered surface,
wherein the inner bottom surface is constituted by a plane perpendicular to an axis of the plunger,
wherein the plurality of discharge flow paths comprises respective inclined inflow ports continuous with the tapered surface of the nozzle and each of the inflow ports is inclined downward toward the center of the nozzle,
wherein the plurality of discharge ports is arranged on a straight nozzle arrangement line, and arranged with such a distance therebetween that globs of a liquid material having landed on the application target join together to form an application line.

20. The application device according to claim 19, comprising a control device including an application program for selectively realizing an application method where a nozzle arrangement line is perpendicular to a direction of an application line, and an application method where a nozzle arrangement line is coincident with a direction of an application line.

21. An application device comprising:
a discharge device that is of j et type; and
a relative driving device configured to move the discharge device and an application target relative to each other,
the discharge device comprising:
a nozzle having a plurality of discharge ports;
a liquid chamber communicating with the plurality of discharge ports via a plurality of discharge flow paths;
a plunger rod that reciprocates in the liquid chamber and is narrower than the liquid chamber; and
a liquid contact member comprising a cylinder portion in which the liquid chamber is formed, wherein the nozzle communicates with the liquid chamber and has a truncated-cone-shaped inner space into which the plunger rod proceeds, the truncated-cone-shaped inner space being surrounded and defined by an upper inside surface of a side wall of the nozzle, a tapered surface of the nozzle that narrows downward from the upper inside surface, and an inner bottom surface located at a lower end of the tapered surface, wherein the inner bottom surface is constituted by a plane perpendicular to an axis of the plunger, wherein the plurality of discharge flow paths comprises respective inclined inflow ports continuous with the tapered surface of the nozzle and each of the inflow ports is inclined downward toward the center of the nozzle, wherein the plurality of discharge ports is arranged on a straight nozzle arrangement line, and arranged with such a distance therebetween that globs of a liquid material having landed on the application target join together to form an application line, the nozzle is detachably attached to a lower end of the cylinder portion to be positioned at a first position where the nozzle arrangement line has a first angle with respect to a line perpendicular to the plunger rod, or at a second position where the nozzle arrangement line is set at 90 degrees with respect to the first angle, and the application device is capable of executing first application, in a state where the nozzle is attached at the first position, to form an application line perpendicular to the nozzle arrangement line by, while moving the discharge device and the application target relative to each other in a direction perpendicular to the nozzle arrangement line, successively discharging the liquid material such that a plurality of liquid globs having been discharged from the plurality of discharge ports have no contact with each other before landing on the application target, and letting the globs of the liquid material having landed join together on the application target, and second application, in a state where the nozzle is attached at the second position, to form an application line in a same direction as the nozzle arrangement line by, while moving the discharge device and the application target relative to each other in the same direction as the nozzle arrangement line, successively discharging the liquid material such that a plurality of liquid globs having been discharged from the plurality of discharge ports have no contact with each other before landing on the application target, and letting the globs of the liquid material having landed join together on the application target.

\* \* \* \* \*